United States Patent [19]
Kisner

[11] Patent Number: 6,033,560
[45] Date of Patent: Mar. 7, 2000

[54] APPARATUS AND METHOD FOR IN-SITU APPLICATION OF CHEMICAL IN A SWIMMING POOL OR SPA

[76] Inventor: Kim T. Kisner, 2125 E. Balboa, Tempe, Ariz. 85282

[*] Notice: This patent is subject to a terminal disclaimer.

[21] Appl. No.: 09/008,005

[22] Filed: Jan. 16, 1998

Related U.S. Application Data

[63] Continuation-in-part of application No. 08/634,973, Apr. 19, 1996, Pat. No. 5,709,793.

[51] Int. Cl.[7] .............................. E04H 4/16; B67D 5/64
[52] U.S. Cl. ...................... 210/169; 210/198.1; 210/238; 222/174; 248/205.2
[58] Field of Search ...................................... 210/753, 756, 210/169, 198.1, 232, 238; 4/490; 222/174, 179.5; 15/1.7; 248/539, 205.2; 422/266, 261

[56] References Cited

U.S. PATENT DOCUMENTS

| | | |
|---|---|---|
| 3,229,859 | 1/1966 | Conroy et al. . |
| 4,089,440 | 5/1978 | Lee . |
| 4,247,216 | 1/1981 | Pansini . |
| 4,454,775 | 6/1984 | Ellis . |
| 4,722,460 | 2/1988 | Madsen . |
| 4,801,886 | 1/1989 | Steininger . |
| 4,836,920 | 6/1989 | Miller, Jr. ................................ 210/169 |
| 4,906,384 | 3/1990 | Hamilton ................................ 210/697 |
| 5,018,890 | 5/1991 | May .......................................... 401/46 |
| 5,045,211 | 9/1991 | Hamilton ................................ 210/697 |
| 5,084,171 | 1/1992 | Murphy et al. ......................... 210/238 |
| 5,108,514 | 4/1992 | Kisner ..................................... 134/22.1 |
| 5,422,001 | 6/1995 | Yagoda et al. .......................... 210/169 |
| 5,487,397 | 1/1996 | Bean . |

*Primary Examiner*—David A. Simmons
*Assistant Examiner*—Fred Prince
*Attorney, Agent, or Firm*—Jeffrey Weiss; Harry Weiss; Paul Davis

[57] ABSTRACT

An improved apparatus 10 and corresponding methods for in-situ application of chemical in a swimming pool or spa or the like. Apparatus 10 generally has a handle receiving portion 50, a handle receiving base 90 to which the handle receiving portion 50 is attached, and at least one securing component 11, 13, or 14. The at least one securing component is made of suitable material (i.e. soft, flexible, bendable, twistable material such as strap, wire, twine, string, or the like) to allow adjustment to surroundingly secure around any size and/or shape container 60. One form of the at least one securing component is straps 11. The straps 11 are inserted and secured near receiving slots 92, and they are placed and surroundingly secured around the container 60. The ends 22 and 24 are secured to the base 90 by folding over an end piece 19 of each strap 11 so that VELCRO™ hook and loop fastener material 15 located on the underside of each end piece 19 engages and attaches to VELCRO™ hook and loop fastener material 16 correspondingly located on an outer portion of the strap 11. A handle strap 12 further secures the handle 62 of the container 60 to the base 90 of the apparatus 10. Another form of the at least one securing component is wires 13. The wires 13 are placed and surroundingly secured around the container 60, and the ends of the wires 13 are tied at the receiving slots 92.

15 Claims, 2 Drawing Sheets

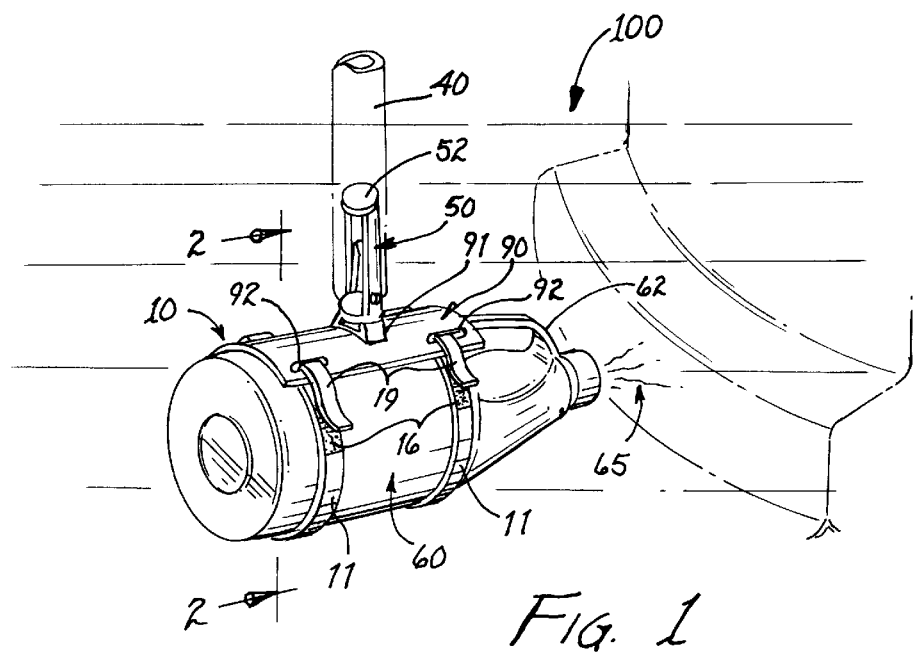
FIG. 1
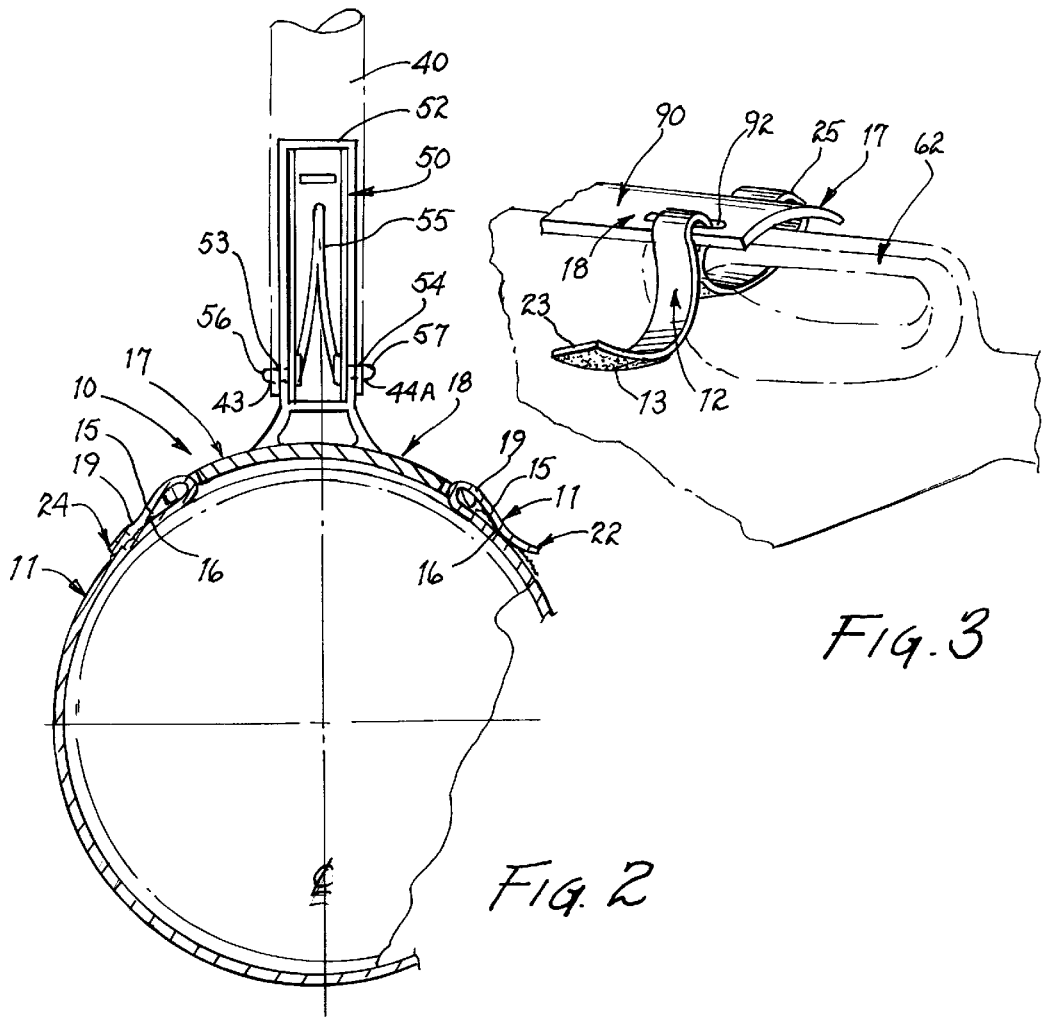
FIG. 2
FIG. 3

APPARATUS AND METHOD FOR IN-SITU APPLICATION OF CHEMICAL IN A SWIMMING POOL OR SPA

This application is a continuation-in-part of U.S. Utility patent application Ser. No. 08/634,973 filed Apr. 19, 1996, now U.S. Pat. No. 5,709,793 issued to Kim T. Kisner on Jan. 20, 1998.

BACKGROUND OF THE INVENTION

1. Fields of Invention

The present invention relates to a device that is used for cleaning or removing stains, scale deposits, and the like from swimming pool or spas or the like, and, more particularly, relates to an apparatus and method for applying chemicals in a swimming pool or spa or the like to clean or remove stains, scale deposits, or the like from desired areas.

2. Discussion of Background and Prior Art

Swimming pool or spas or the like require a considerable amount of maintenance and upkeep. Swimming pool or spas or the like have to oftentimes be cleaned, and the water in the pool or spa or the like has to be periodically checked and treated. Common problems associated with swimming pool or spas or the like are the existence of stains and the build-up of scale deposits (such as calcium deposits) on their surfaces (i.e. walls, floors, stairs, etc. of the swimming pool or spa or the like). In the past, one method of generally cleaning or removing the stains, scale deposits, and the like would require that the water in the swimming pool or spa or the like be drained from the pool so that the surface could be directly and more effectively treated and cleaned or acid washed.

Various types of acid washes have been developed to clean or remove stains, scale deposits, and the like from interior surfaces of swimming pool or spas or the like that contain water, and the use of these acid washes avoids having to drain any water from the swimming pool or spa or the like. U.S. Pat. No. 5,108,514 to Kisner ("Kisner I") discloses that these acid washes can be made from a combination of relatively concentrated acid which does not produce metal ions, such as hydrochloric acid and a relatively strong metal chelating agent, such as EDTA and/or its derivatives. Furthermore, U.S. Pat. Nos. 4,906,384 and 5,045,211 to Hamilton disclose that these acid washes can be made from various types of acid combinations such as hydrochloric acid, sulfamic acid, and sodium bisulfate. These acids are mixed with water individually and poured directly into the pool to acidify the water. This method, however, is costly, time consuming, and not that effective.

Kisner I also generally discloses in-situ methods for cleaning swimming pool or spas or the like without draining the water. The disclosed methods use the acid wash solutions described in the Kisner I patent or any equivalent acid washes which are stored and transported in plastic jugs or bottles. Kisner I teaches that the cap of the container is removed from the neck to expose an open mouth of the container. The opened neck is tipped or tilted toward the wall surfaces of the pool, and the container is lowered and allowed to sink down the side towards the bottom surface of the swimming pool or spa or the like. The acid wash solution spills from the container and generally onto the interior surfaces or sides of the pool. As the container slides along the wall surface towards the bottom surface, the acid wash pours out of the open mouth directly onto the side or wall surfaces and over the stains, scale deposits, etc. which are to be removed.

Kisner I further teaches that an instrument such as a brush apparatus may be used to insure that the acid wash solution is spilled to the wall or bottom surfaces. The brush apparatus is used in conjunction with a conventional swimming pool or spa handle or pole, and the brush apparatus includes a brush portion that is preferably made of a wire construction. The handle or pole of the brush apparatus can be contacted to the bottom of the container, and/or the brush portion can contact a side portion of the container in order to adjustably position the bottle to insure that the acid wash solution spills or pours directly onto the interior wall or bottom surfaces. Furthermore, the handle and the brush portion can be positioned to hold or trap the container against a wall surface at a point near the bottom surface to insure that the vertical wall of the pool receives adequate exposure to the flowing acid wash solution. After the acid wash solution has emptied from the container, carbon dioxide results from the reaction of hydrochloric acid and scale deposits collects in the container and thereby enables it to rise to the water surface so that it can be retrieved and re-used.

However, the disadvantages of using an instrument such as the brush apparatus to position or maneuver the container is that it may be difficult, awkward, or cumbersome to control the movement of the container. The user must use the brush apparatus or instrument to manipulate and position the container in the generally right direction, and the user will have difficulty moving or maneuvering the container in the precise direction. Also, the amount of acid wash applied to a desired or certain area cannot be fairly precisely controlled. The user may have to use a great deal of effort and energy to move the container. An amount of acid, therefore, may be wasted on areas that may not need cleaning or deposit removal. Also, the use of the brush apparatus to control the movement of the container would also be difficult or impossible if the swimming pool or spa water is cloudy, muddy, murky, etc. At times, the container also may not rise from underwater to the surface, and the brush instrument would be difficult to use to retrieve the container.

Kisner I also teaches alternate application apparatuses and methods that spray the acid wash onto the desired surfaces of the pool. Kisner I teaches the use of a spray gun assembly that includes a container (i.e. gallon plastic jug or bottle), a flexible tube or hose inserted in through the opening of the container to the bottom of the container, and a spray gun that is capable of drawing acid wash from the container up through the hose by a pumping means. Kisner I also teaches the use of a pressurized tank having a pressure regulator or control valve. The regulator or valve is attached to a tube or hose, and the tube or hose is attached to a wand or tube. A nozzle apparatus having a larger flared opening is attached to the wand or tube, and the acid wash solution is pressure sprayed through the flared opening of the nozzle apparatus.

These spray apparatuses methods provide better efficiency and accuracy for applying the acid wash solution to desired areas of the swimming pool or spa or the like than the use of an instrument such as the brush apparatus. However, these spray apparatuses and methods may not be very convenient to use since the entire spray gun assembly or the entire pressurized tank apparatus have to be transported to various areas along the perimeter of the pool. The transport of these devices could be cumbersome or difficult for the user since there are a number of attached components or pieces for the spray gun assembly and the pressurized tank apparatus. Furthermore, the barrel of the spray gun or the tube or wand length of the pressurized tank apparatus have to be quite long in order to generally reach the bottom of the pool. The costs associated with these spray systems are most likely higher than the brush apparatus or other such devices since they generally have more components, are not as simple as the brush apparatus, and do not incorporate the use of existing swimming pool or spa equipment (i.e. conventional swimming pool or spa pole or handle).

Therefore, there is a need for an apparatus and method for applying chemical in a swimming pool to clean or remove stains, scale deposits, or the like from desired areas that enables the user to more accurately and precisely control the movement of the chemical container and the amount of chemical to be applied to desired areas, that is simple to manufacture and use, that is easy and convenient in holding a pre-existing chemical container(s), that can incorporate the use of presently existing swimming pool or spa equipment, that enables direct and easy retrieval of the container, and that is cost effective for the user. It is an object of the present invention to overcome the problems and limitations of the prior art that has been discussed.

SUMMARY OF THE INVENTION

Set forth is a brief summary of the invention in order to solve the foregoing problems and achieve the foregoing and other objects, benefits, and advantages in accordance with the purposes of the present invention as embodied and broadly described herein.

Accordingly, it is an object and advantage of the present invention to provide an apparatus for in-situ application of chemical in a swimming pool or spa or the like that includes a handle receiving base having receiving slots, at least one securing component having ends inserted and secured near the receiving slots wherein the at least one securing component encompasses and holds a container that is capable of holding [swimming pool or spa] chemical, and a handle receiving portion attached to the base for receiving and holding a handle wherein the handle is capable of being grasped by a user to allow the user to move the base and the container in the swimming pool or spa or the like and to allow the chemical in the container to flow to desired areas of the swimming pool or spa or the like.

It is one aspect and advantage of the present invention to provide an apparatus for in-situ application of chemical/acid wash solution to a swimming pool or spa or the like in which the at least one securing component is at least one securing strap or the like.

It is another aspect and advantage of the present invention to provide an apparatus for in-situ application of chemical/acid wash solution to a swimming pool or spa or the like in which the at least one securing component is at least one wire or the like placed and surroundingly secured around the container wherein ends of each of the at least one wire are inserted through and tied near the receiving slots.

It is a further aspect and advantage of the present invention to provide an apparatus for in-situ application of chemical/acid wash solution to a swimming pool or spa or the like in which the at least one securing component is at least one wire frame or the like having hooked ends wherein the at least one wire frame is placed and surroundingly secured around the container and wherein the hooked ends hook and secure into the receiving slots.

It is still a further aspect and advantage of the present invention to provide an apparatus for in-situ application of chemical/acid wash solution to a swimming pool or spa or the like in which the at least one securing component adjusts to surroundingly secure around any size and/or shape of the container.

It is still another aspect and advantage of the present invention to provide an apparatus for in-situ application of chemical/acid wash solution to a swimming pool or spa or the like in which the at least one securing component is made from a soft, flexible, bendable, or twistable material such as strap, wire, twine, string, or the like that is able to be twisted, fixed, or tied near the receiving slots.

It is another object and advantage of the present invention to provide a method of making an apparatus for in-situ application of chemical in a swimming pool or spa or the like that includes the steps of providing a handle receiving base having receiving slots, inserting and securing at least one securing component having ends near the receiving slots wherein the at least one securing component encompasses and holds a container that is capable of holding chemical, and attaching a handle receiving portion to the base for receiving and holding a handle wherein the handle is capable of being grasped by a user to allow the user to move the base and the container in the swimming pool or spa or the like and to allow the chemical in the container to flow to desired areas of the swimming pool or spa or the like.

It is a further object and advantage of the present invention to provide a method of applying chemical in a swimming pool or spa or the like that includes the steps of providing an apparatus for in-situ application of chemical in a swimming pool or spa or the like having a handle receiving base that has receiving slots, at least one securing component having ends inserted and secured near the receiving slots wherein the at least one securing component encompasses and holds a container that is capable of holding chemical, and a handle receiving portion attached to the base, using the at least one securing component to hold the container to the base, attaching a handle to the handle receiving portion wherein the handle is capable of being grasped by a user, using the handle to move the container to desired areas of the swimming pool or spa or the like to allow the chemical in the container to flow to the desired areas.

BRIEF DESCRIPTION OF THE DRAWINGS

FIG. 1—Perspective view of the a preferred embodiment improved apparatus for in-situ application of chemical/acid wash in a swimming pool or spa or the like showing the apparatus holding a chemical/acid wash container by use of straps and further showing the apparatus attached to a conventional swimming pool pole or handle wherein the apparatus is being used to clean desired areas of the swimming pool or spa or the like.

FIG. 2—Cross-sectional view of the preferred embodiment apparatus for in-situ application of chemical/acid wash solution according to the line 2—2 of FIG. 1.

FIG. 3—Perspective view of the base and a handle strap of the preferred embodiment apparatus of FIG. 1 showing the handle strap threaded through the insertion slots in the base and wherein the handle strap is placed around the handle of the chemical container in which the handle is shown in dotted lines.

DETAILED DESCRIPTION OF THE INVENTION

Figure 4:
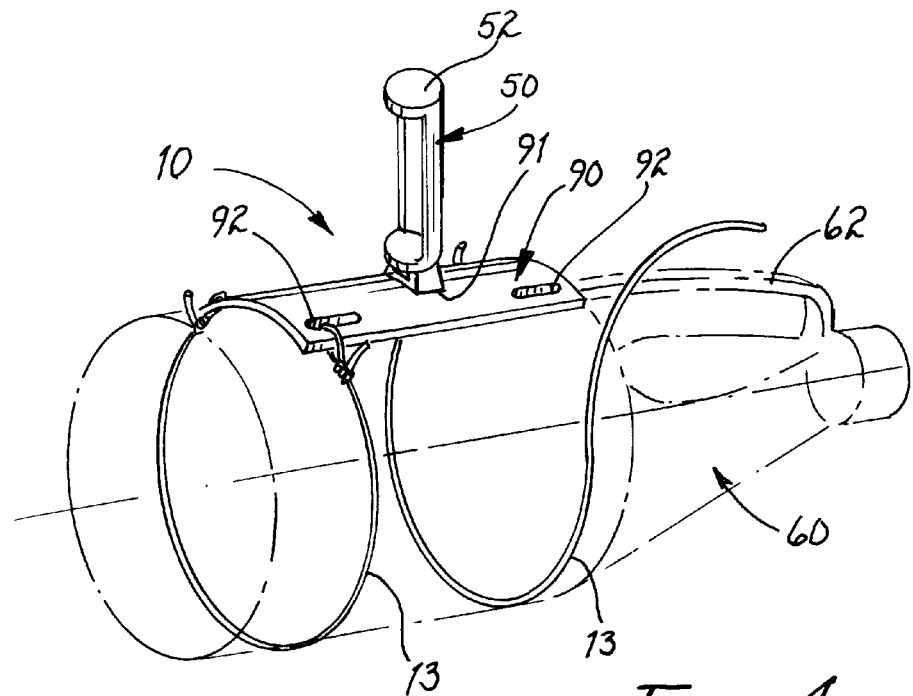
FIG. 4—Perspective view of the preferred embodiment apparatus for in-situ application of chemical/acid wash solution in a swimming pool or spa or the like showing the apparatus holding a chemical/acid wash container by use of wires tied at the ends.

The present invention generally discloses apparatus 10 for in-situ application of chemical in a swimming pool or spa or the like and methods of manufacturing and using such an apparatus. The apparatus 10 is able to be adapted to receive and hold a container 60 of acid wash or chemical 65 and is able to also be adapted to receive a conventional swimming pool handle or pole 40. The handle/pole 40 is able to be grasped by a user to allow the user to move the apparatus holding the container 60 to allow the chemical or acid wash solution 65 in the container to flow to desired areas of the swimming pool or spa or the like.

Any type of acid wash solution or chemical 65 is able to be used in conjunction with the present invention. For example, one type of acid wash solution 65 that is able to be used with the present invention is a mixture of hydrochloric acid and oxalic acid. The acid wash mixture comprises a solution of oxalic acid in water added to concentrated commercial hydrochloric acid or muriatic acid. After the acid wash solution 65 is applied in the swimming pool/spa 100, a neutralizer of magnesium oxide or magnesium hydroxide slurry in a brine base of sodium chloride or sodium carbonate is placed into the swimming pool/spa or the like to neutralize the acid. However, other types of acid wash solution or chemical 65 that is able to be filled and stored in a container such as container or bottle 60 is able to be used with the present invention as well. The present invention provides a chemical application apparatus that is simple in construction and cost effective for being able to directly and more accurately and precisely apply acid wash solution or chemical to desired areas of a swimming pool or spa or the like and provides an apparatus that is able to incorporate the use of presently existing swimming pool/spa or the like equipment such as a conventional swimming pool/spa handle or pole 40 and that enables direct and easy retrieval of the chemical/acid wash solution container.

FIGS. 1, 2, and 3 show a preferred embodiment chemical application apparatus 10. Referring to FIGS. 1 and 2, apparatus 10 generally has a handle receiving portion 50, a handle receiving base 90 to which the handle receiving portion 50 is attached (i.e. FIGS. 1 and 3 show that the handle receiving portion 50 is attached to the handle receiving base at a central location 91 on the top surface of handle receiving base 90), and straps 11. Referring to FIGS. 1 and 2, straps 11 or the like are inserted and secured to one set of receiving slots 92 which are at one side 17 of the handle receiving base 90. The straps 11 or the like are attached to the base 90 by inserting one end 22 of each strap 11 into each of the slots 92 at side 17 of the base 90, threading each strap 11 through the slot 92 at side 17 and placing and surroundingly securing each strap 11 around the container 60, and further threading each strap 11 through the slot 92 at side 18 of the base 90. As shown in FIG. 2, the end 24 of each strap 11 is located and secured to each of the slots 92 at side 17 of the base 90, and the end 22 of each strap 11 is located and secured to each of the slots 92 at side 18 of the base 90. The ends 22 and 24 are secured to the base 90 by folding over an end piece 19 of each strap 11 so that VELCRO™ hook and loop fastener material 15 located on the underside of each end piece 19 engages and attaches to VELCRO™ hook and loop fastener material 16 correspondingly located on an outer portion of the strap 11 as shown in FIGS. 1 and 2.

FIG. 3 shows that a handle strap 12 or the like further secures the handle 62 of the container 60 to the base 90 of the apparatus 10. The strap 12 is inserted through the base 90 at the set of receiving slots 92 near the handle 62 of the container 60. The strap 12 is inserted to the base 90 by inserting end 23 of the strap 12 into the slot 92 at side 17 of the base 90, threading the strap 12 through the slot 92 at side 17 and placing each strap 12 underneath the handle 62 of the container 60, and further threading the strap 12 through the slot 92 at side 18 of the base 90. As shown in FIG. 3, the end 25 of the strap 12 is located and secured to side 17 of the base 90, and the end 23 of the strap 12 is located and secured to slot 92 at side 18 of the base 90. The ends 23 and 25 are secured to the base 90 by having the ends of the strap 12 with VELCRO™ hook and loop fastener material 13 located on the underside of each end engage and attach to VELCRO™ hook and loop fastener material 16 correspondingly located on an outer portion of the strap 11.

FIG. 4 shows the preferred embodiment apparatus 10 for in-situ application of chemical/acid wash solution 65 in a swimming pool or spa or the like 100. The apparatus 10 is identical to the one shown in FIGS. 1 and 2 except that the apparatus 10 of FIG. 4 shows that the chemical/acid wash container 60 is secured to the apparatus 10 by use of wires 13 or the like inserted and secured to the base 90 at receiving slots 92. The wires 13 are placed and surroundingly secured around the container 60, and the ends of the wires 13 are tied at the receiving slots 92.

Figure 5:
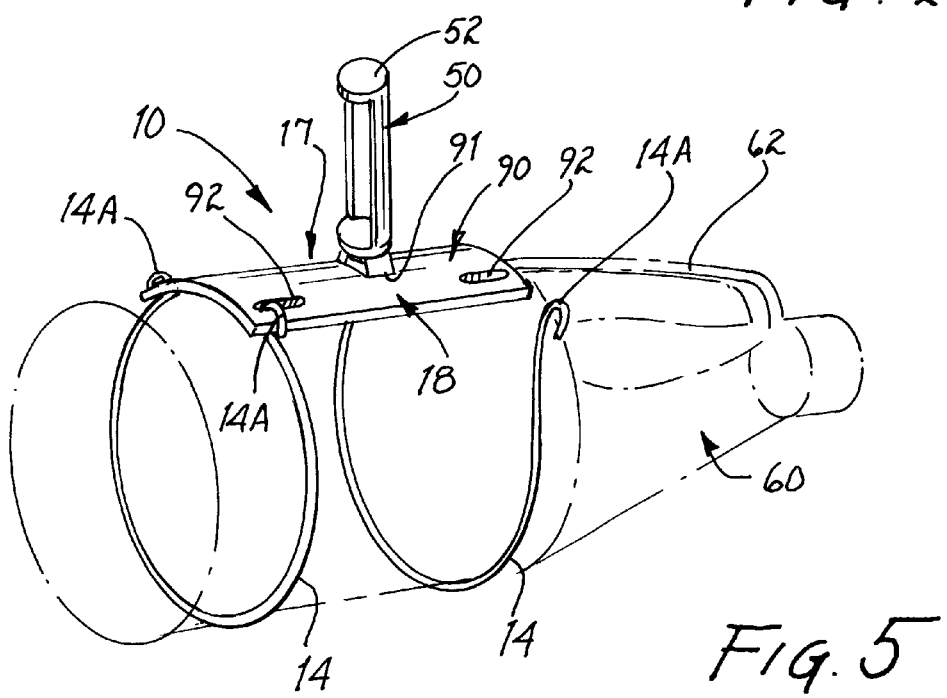
FIG. 5—Perspective view of the preferred embodiment apparatus for in-situ application of chemical/acid wash solution in a swimming pool or spa or the like showing the apparatus holding a chemical/acid wash container by use of wire frames having hooked ends.

FIG. 5 shows the preferred embodiment apparatus 10 for in-situ application of chemical/acid wash solution 65 in a swimming pool or spa or the like 100. The apparatus 10 is also identical to the one shown in FIGS. 1 and 2 except that the apparatus 10 of FIG. 5 shows that the chemical/acid wash container 60 is secured to the apparatus 10 by use of wire frames 14 or the like having hooked ends 14A. One set of hooked ends 14A of the wire frames 14 are hooked and secured to the slots 92 at side 17 of the base 90. The wire frames 14 are placed around and surroundingly secured around the container 60. The other set of hooked ends 14A of the wire frames 14 are hooked and secured to the slots 92 at side 18 of the base 90.

The present invention provides an apparatus 10 for in-situ application of chemical/acid wash solution 65 to a swimming pool or spa or the like 100 in which the at least one securing component adjusts to surroundingly secure around any size and/or shape of the container 60. The apparatus 10 has at least one securing component that is not in any way limited to the embodiments described above, and the at least one securing component is able to be made from any suitable material that would allow adjustment to surroundingly secure around any size and/or shape of the container 60 including but not limited to a soft, flexible, bendable, or twistable material such as strap, wire, twine, string, or the like that is able to be twisted, fixed, or tied near the receiving slots 92.

Referring to FIGS. 1, 2, 4, and 5, the handle receiving portion 50 has a generally cylindrical portion 52 over which a portion of cylindrical handle 40 (i.e. which includes but is not limited to presently existing and conventional swimming pool/spa or the like equipment handles or poles) is received and held, and the handle receiving portion 50 further has securing component(s)/securing means to secure the handle 40 to the handle receiving portion 50. FIGS. 1 and 2 show that the securing component is a spring clip 55 that is generally located within the interior of the cylindrical portion 52 of handle receiving portion 50. The spring clip 55 has engaging components 56 and 57 that can be respectively pressed through openings 53 and 54 to the extent that the user is able to slide a portion of handle 40 over the handle receiving portion 50 (i.e. components 56 and 57 are generally pressed flush with the handle receiving portion 50 so that the handle 40 is able to be moved or rotated over the handle receiving portion 50). Openings 43 and 44A on handle 40 are aligned to the engaging components 56 and 57, and the spring action of spring clip 55 causes components 56 and 57 to respectively spring through the openings 53 and 54 of handle receiving portion 50 and through openings 43 and 44A of handle 40 thereby locking and securing the handle 40 to the handle receiving portion 50.

The present invention is not limited to the use of spring clips 55 for securing the handle 40 to the handle receiving portion 50. Any suitable methods or components may be used to secure the handle 40 to the handle receiving portion 50 including but not limited to the use of securing components such as bolts and nuts and integrally attaching the handle or pole 40 to the handle receiving portion 50.

The present invention provides an apparatus 10 and method for applying chemical/acid wash solution in a swimming pool or spa or the like 100 to clean or remove stains, scale deposits, or the like from desired areas that enables the user to more accurately and precisely control the movement of the chemical container 60 and the amount of chemical 65 to be applied to desired areas. The present invention is able to incorporate the use of presently existing swimming pool or spa or the like equipment (i.e. presently existing or conventional handle or pole 40) and enables direct and easy retrieval of the chemical/acid wash solution container 60. The present invention is simple to manufacture and use and is also cost effective to make as well.

The foregoing description of a preferred embodiment and best mode of the invention known to applicant at the time of filing the application has been presented for the purposes of illustration and description. It is not intended to be exhaustive or to limit the invention to the precise form disclosed, and obviously many modifications and variations are possible in the light of the above teaching. The embodiment was chosen and described in order to best explain the principles of the invention and its practical application to thereby enable other skilled in the art to best utilize the invention in various embodiments and with various modifications as are suited to the particular use contemplated.

What is claimed is:

1. An apparatus for in-situ application of chemical in a swimming pool or spa comprising:
    a handle receiving base having receiving slots,
    at least one adjustable securing component comprising a bendable material,
    wherein the at least one adjustable securing component has ends inserted and secured within the receiving slots wherein the at least one securing component encompasses, holds, and adjustably conforms to an exterior shape of a container that is capable of holding swimming pool or spa chemical, and
    a handle receiving portion attached to the base for receiving and holding a handle wherein the handle is capable of being grasped by a user to allow the user to move the base and the container in the swimming pool or spa and to allow the chemical in the container to flow to desired areas of the swimming pool or spa.

2. The apparatus according to claim 1 wherein the at least one securing component is at least one securing strap.

3. The apparatus according to claim 2 wherein the at least one securing strap is two securing straps.

4. The apparatus according to claim 2 wherein each of the at least one securing strap is placed to encompass and hold the container and that each of the at least one securing strap has ends that are inserted through and secured near the receiving slots of the base.

5. The apparatus according to claim 4 further comprising hook and loop fastener material attached on one side near the ends of each of the straps and corresponding hook and loop fastener material attached on another side of a fold-over portion of each of the straps so that each of the ends of the straps insert through and secure near the receiving slots and the fold over portions fold over at the ends of each of the straps so that the hook and loop fastener materials engage and attach to each other to secure the ends of the straps near the receiving slots.

6. The apparatus according to claim 1 wherein the at least one securing component is at least one wire placed and surroundingly secured around the container wherein ends of each of the at least one wire are inserted through and tied near the receiving slots.

7. The apparatus according to claim 1 wherein the at least one securing component is at least one wire frame having hooked ends wherein the at least one wire frame is placed and surroundingly secured around the container and wherein the hooked ends hook and secure into the receiving slots.

8. The apparatus according to claim 1 wherein the handle receiving portion is attached to a central portion of the base.

9. The apparatus according to claim 1 further comprises:
    a handle strap that secures the handle of the container to the base by being inserted through and secured near a set of the receiving slots near the handle of the container and placing and holding the handle strap underneath the handle.

10. A method of making an apparatus for in-situ application of chemical in a swimming pool or spa comprising the steps of:
    providing a handle receiving base having receiving slots,
    inserting and securing at least one adjustable securing component comprising a bendable material having ends within the receiving slots wherein the at least one securing component encompasses, holds, and adjustably conforms to an exterior shape of a container that is capable of holding swimming pool or spa chemical, and
    attaching a handle receiving portion to the base for receiving and holding a handle wherein the handle is capable of being grasped by a user to allow the user to move the base and the container in the swimming pool or spa and to allow the chemical in the container to flow to desired areas of the swimming pool or spa.

11. The method of making an apparatus according to claim 10 wherein the inserting and securing at least one securing component step further comprises the step of:
    inserting and securing at least one securing strap having ends near the receiving slots wherein the at least one securing strap encompasses and holds a container that is capable of holding swimming pool or spa chemical.

12. The method of making an apparatus according to claim 11 wherein the inserting and securing at least one securing strap step further comprises the step of:
    inserting and securing two securing straps wherein each of the two securing straps has ends near the receiving slots wherein the two securing straps encompass and hold a container that is capable of holding swimming pool or spa chemical.

13. The method of making an apparatus according to claim 11 further comprising the step of:
    attaching hook and loop fastener material onto one side near the ends of each of the at least one strap and attaching corresponding hook and loop fastener material onto another side of a fold-over portion of each of the at least one strap so that each of the ends of the at least one strap insert through and secure near the receiving slots and the fold over portions fold over at the ends of each of the at least one strap so that the hook and loop fastener materials engage and attach to each other to secure the ends of the at least one strap near the receiving slots.

14. The method of making an apparatus according to claim 10 wherein the inserting and securing at least one securing component step further comprises the step of:

placing and surroundingly securing at least one wire around the container wherein ends of each of the at least one wire are inserted through and tied near the receiving slots.

15. The method of making an apparatus according to claim 10 wherein the inserting and securing at least one securing component step further comprises the step of:

placing and surroundingly securing at least one wire frame having hooked ends around the container and wherein the hooked ends hook and secure into the receiving slots.

* * * * *